United States Patent [19]

Ito

[11] Patent Number: 5,875,043
[45] Date of Patent: Feb. 23, 1999

[54] OPTICAL SCANNER FOR DETECTING LIGHT INTENSITY FROM REFLECTED IMAGE-READING LIGHT

[75] Inventor: Koji Ito, Nagoya, Japan

[73] Assignee: Brother Kogyo Kabushiki Kaisha, Nagoya, Japan

[21] Appl. No.: 617,057

[22] Filed: Mar. 18, 1996

[30] Foreign Application Priority Data

Mar. 22, 1995 [JP] Japan ................................. 7-062424

[51] Int. Cl.$^6$ .................................................. H04N 1/04
[52] U.S. Cl. ........................ 358/475; 358/474; 358/480; 358/481
[58] Field of Search ................................... 358/475, 474, 358/494, 480, 481, 406, 504; 359/201, 202, 212, 215, 216, 217; 399/4, 5, 137, 52; 250/208.1

[56] References Cited

U.S. PATENT DOCUMENTS

| 4,199,219 | 4/1980 | Suzki et al. | 359/209 |
|---|---|---|---|
| 4,691,228 | 9/1987 | Nagano | 358/509 |
| 4,736,110 | 4/1988 | Awamura | 250/201.4 |
| 4,960,313 | 10/1990 | Yamanaka | 359/211 |
| 5,002,348 | 3/1991 | Wolf | 359/107 |
| 5,025,313 | 6/1991 | Parulski et al. | 358/514 |
| 5,132,833 | 7/1992 | Diau | 359/221 |
| 5,166,820 | 11/1992 | Fujita | 359/211 |
| 5,184,012 | 2/1993 | Yamamoto | 250/234 |
| 5,307,198 | 4/1994 | Sullivan | 359/196 |
| 5,332,892 | 7/1994 | Li et al. | 250/568 |
| 5,471,046 | 11/1995 | Meyers | 250/201.7 |
| 5,475,508 | 12/1995 | Maeshima et al. | 358/514 |
| 5,481,381 | 1/1996 | Fujimoto | 358/505 |
| 5,488,490 | 1/1996 | Sawada et al. | 358/487 |
| 5,506,392 | 4/1996 | Barkan et al. | 235/472 |
| 5,526,165 | 6/1996 | Toda et al. | 359/202 |
| 5,532,866 | 7/1996 | Shibata et al. | 359/216 |
| 5,604,622 | 2/1997 | Iizuka et al. | 359/207 |
| 5,627,670 | 5/1997 | Minoura et al. | 359/212 |

FOREIGN PATENT DOCUMENTS

| A-55-159412 | 12/1980 | Japan | G02B 27/00 |
|---|---|---|---|
| A-63-36277 | 2/1988 | Japan | G03G 15/04 |
| A-1-155370 | 6/1989 | Japan | G03G 15/04 |

Primary Examiner—Kim Yen Vu
Assistant Examiner—Kimberly A. Williams
Attorney, Agent, or Firm—Oliff & Berridge PLC

[57] ABSTRACT

An optical scanner including a light emitting device which emits an image-reading light toward an original having an original image thereon, such that the image-reading light scans the original by irradiating each of a plurality of positions on the original at a corresponding one of a plurality of times, and a light detecting device which detects the image-reading light reflected from the original and thereby reads the original image thereon, the light detecting device including a plurality of light detecting elements each of which is associated with at least a part of the original and detects the image-reading light reflected from the part of the original, the part of the original including a plurality of positions on the original.

29 Claims, 9 Drawing Sheets

POSITION ON ORIGINAL 6

OPTICAL SCANNER FOR DETECTING LIGHT INTENSITY FROM REFLECTED IMAGE-READING LIGHT

BACKGROUND OF THE INVENTION

1. Field of the Invention

The present invention relates to an optical scanner which has the function of reading images and which may be employed in, e.g., a facsimile machine or a copying machine.

2. Related Art Statement

There is known a laser facsimile machine or a copying machine which has a first optical system for reading images and a second optical system for recording images, the two optical systems being independent of each other. In particular, as the image-reading optical system, there has been known an optical scanner which, as described below, scans an original having an original image thereon and reads the original image using a one-dimensional-array optical sensor (i.e., "line sensor"). A line sensor employed in an optical scanner is disclosed in Japanese Patent Application laid open for inspection under Publication No. 55(1980)-159412.

FIG. 12 shows a conventional copying machine. The copying machine has an image-reading optical system including a light source 113 which emits a linear light toward an original (not shown) placed on a support surface of a transparent original-supporting member 114. The optical path of the linear light reflected from the original is deflected by a full-speed scan mirror 111 and then by a half-speed scan mirror 112. The linear light reflected by the half-speed scan mirror 112 is converged by an image-forming lens 116 as a light converger, so that the converged light is incident to an array of CCDs (charge-coupled devices) 115 which extends in a direction perpendicular to the drawing sheet of FIG. 12. The light source 113 also extends in a direction perpendicular to the drawing sheet of FIG. 12, emits the linear light toward the original supported on the support member 114, and is moved with the full-speed scan mirror 111 to scan the original. The copying machine is disclosed in Japanese Patent Application laid open for inspection under Publication No. 63(1988)-36277.

When the copying machine starts an image scanning operation, the full-speed scan mirror 111 takes a position indicated at solid lines. During the scanning operation, the mirror 111 is moved in a direction indicated at arrow. When the mirror 111 reaches a position indicated at broken lines, the scanning operation is ended. Meanwhile, the half-speed scan mirror 112 is provided by a pair of mirrors and, for the scanning operation, the mirror 112 is moved in a direction indicated at arrow from a position indicated at solid lines to a position indicated at broken lines. Since during the scanning operation the ratio, 2 (=2/1), of the speed of the full-speed scan mirror 111 to that of the half-speed scan mirror 112 is maintained, the original image is detected or read with accuracy by the line sensor 115.

The copying machine additionally has an image-recording optical system including a light source (not shown), such as a semiconductor laser, which emits a light beam which is incident to a rotary polygon mirror 117 as a light deflector. After the light beam is reflected and deflected by the polygon mirror 117 which is being rotated at a uniform angular speed, the light beam passes through an image-forming lens 118 such as an f$\theta$ lens and is reflected by a reflecting mirror 119, so that the reflected light scans a photoconductive drum 120 at a uniform speed. Thus, an electrostatic latent image corresponding to image data used to drive the laser as the light source is formed in an outer circumferential surface of the drum 120.

FIG. 13 shows another image-reading optical system or scanner which is employed in, e.g., a conventional copying machine. The optical scanner includes a semiconductor laser 201 as a light source, a rotary polygon mirror 202 which deflects the light emitted by the light source 201, an image-forming lens 203 which converges the light deflected by that polygon mirror 202, so the the converged light scans an original 206 having an original image thereon, a single photodiode 261 which detects the light reflected from the original 206, and a control device 207 which controls the light source 201 and the polygon mirror 202. More specifically, the control device 207 controls the light source 201 to emit a laser beam which is incident to the polygon mirror 202 which is being rotated at a uniform speed. The laser beam deflected by the rotary polygon mirror 202 is converged by the image-forming lens 203, so that the converged light scans the original 206 by irradiating each of different positions on the original 206 at a corresponding one of different times. The light reflected from the original 206 is detected by the photodiode 261. The photodiode 261 produces an electric signal indicative of a detected intensity of the light reflected from the original 206, and supplies the electric signal to the control device 207. Based on the electric signal supplied from the photodiode 261, the control device 207 produces and stores, in a memory, image data indicative of the original image carried on the original 206. An example of this optical scanner is disclosed in Japanese Patent Application laid open for inspection under Publication No. 1(1989)-155370.

A light intensity detected by the photodiode 261 when the light converged by the image-forming lens 203 irradiates a position or picture element where an image is present, is significantly different from a light intensity detected by the same 261 when the light irradiates a position where no image is present. Thus, the image data produced by the control device 207 comprise data indicative of the light intensities detected by the photodiode 261 when the light irradiates each of the positions or picture elements on the original 206.

However, in the first prior image-reading optical system shown in FIG. 12, the array of CCDs 115, i.e., line sensor is employed to detect an original image. Since each of the CCDs 115 detects the intensity of light reflected from a single position or picture element on the original, a greater number of CCDs are needed to increase the degree of resolution of the detected image. However, the number of light sensing elements (e.g., CCDs) of a line sensor cannot exceed a certain upper limit. In addition, an increased number of light sensing elements cost higher.

In the second prior image-reading optical system shown in FIG. 13, the single photodiode 261 as the light detecting device is employed to read an original image and provide image data indicative of the read image. However, since an original has not only positions or picture elements near to the photodiode 261 but also positions remote from the same 261, the photodiode 261 cannot produce electric signals with a uniform magnitude for all the positions on the original, if the original has no image thereon. Thus, the accuracy of image reading of the optical system is low.

SUMMARY OF THE INVENTION

It is therefore an object of the present invention to provide an optical scanner which reads an image with accuracy and which costs low.

The above object has been achieved by the present invention, which provides an optical scanner comprising a light emitting device which emits an image-reading light toward an original having an original image thereon, such that the image-reading light scans the original by irradiating each of a plurality of positions on the original at a corresponding one of a plurality of times, and a light detecting device which detects the image-reading light reflected from the original and thereby reads the original image thereon, the light detecting device including a plurality of light detecting elements each of which is associated with at least a part of the original and detects the image-reading light reflected from the part of the original, the part of the original including a plurality of positions on the original. Each of the light detecting elements may be associated with a part or an entirety of a support member which supports the original. The positions on the original may be the picture elements on the original.

In the optical scanner constructed as described above, the plurality of light detecting elements are employed to read the original image, and each light detecting element is associated with a part or an entirety of the original to detect the light reflected from the part or entirety of the original, the part of the original including a plurality of positions on the original. Therefore, the accuracy of reading of images is improved as compared with the case where a single light detecting element is employed to read an original as a whole. In addition, since the number of the light detecting elements employed may be much smaller than that of a conventional line sensor, the present optical scanner costs low.

In a preferred embodiment of the present invention, the each of the light detecting elements produces an output indicative of the detected image-reading light, and the light detecting device further comprises a data producing device which produces image data representative of the read original image, the image data comprising data indicative of the output of the each of the light detecting elements in relation with the each of the positions on the original.

In another embodiment of the present invention, the light emitting device comprises a light source which emits the image-reading light, a light deflector which deflects the image-reading light emitted by the light source, toward the original, such that the image-reading light scans the original, and a light converger which converges the image-reading light deflected by the light deflector, so that the converged image-reading light irradiates the each of the positions on the original.

In another embodiment of the present invention, the optical scanner further comprises a memory device which stores image data representative of the original image read by the light detecting device, a photosensitive body, and a control device which controls, according to the image data stored in the memory device, the light source to emit an image-forming light toward the photosensitive body via the light deflector and the light converger, so that a latent image corresponding to the original image is formed on the photosensitive body. The control device may control the light source to emit the light, or stop emitting the light, according to the image data. The photosensitive body may be a photoconductive drum which is rotated by an electric motor under control of the control device. In this case, the light source, the light deflector, and the light converger are commonly used for reading the original image and recording the read image. Accordingly, the size and cost of the present image scanner as a whole are reduced.

In another embodiment of the present invention, the optical scanner further comprises a selector which is provided in an optical plane in which each of the image-reading and image-forming lights converged by the light converger passes, the selector selectively directing the image-reading light toward the original and the image-forming light toward the photosensitive body.

In another embodiment of the present invention, the selector comprises at least one reflecting mirror which selectively reflects the image-reading light toward the original and the image-forming light toward the photosensitive body. The reflecting mirror costs low.

In another embodiment of the present invention, the selector further comprises a drive device which rotates the reflecting mirror to each of two angular positions at one of which the mirror reflects the image-reading light toward the original and at the other of which the mirror reflects the image-forming light toward the photosensitive body.

In another embodiment of the present invention, the reflecting mirror comprises a half mirror which permits a portion of the image-reading light reflected from the original and incident thereto, to pass therethrough so as to be detected by the light detecting device. In this case, the image-reading light reflected by the half mirror may be incident perpendicularly to the original, and the light perpendicularly reflected by the original may be detected by the light detecting device disposed behind the half mirror. Accordingly, each of the light detecting elements detects the reflected light with high intensity.

In another embodiment of the present invention, the selector comprises, as the at least one reflecting mirror, a first reflecting mirror which reflects the image-reading light toward the original and a second reflecting mirror which reflects the image-forming light toward the photosensitive body, and a drive device which selectively moves each of the first and second reflecting mirrors to an operative position thereof in the optical plane. In this case, an angular position of each of the first and second reflecting mirrors with respect to the light deflector and converger on one hand and the original and the photosensitive body on the other hand need not be changed to selectively reflect the image-reading light toward the original and the image-forming light toward the photosensitive body. Accordingly, each of the first and second reflecting mirrors can be moved to the operative position in a short time.

In another embodiment of the present invention, the photosensitive body is positioned relative to the reflecting mirror such that a length of an optical path of the image-forming light between the mirror and the photosensitive body is equal to a length of an optical path of the image-reading light between the mirror and the original. In this case, the range of scanning on the original is equal to the range of scanning on the photosensitive body. In the case where the size of the original read by the present scanner is equal to the size of a recording sheet on which the latent image formed on the photosensitive body is developed and recorded, the image data provided by the light detecting device may directly be used to record the image, without needing any special data processing.

In another embodiment of the present invention, the light detecting device is provided in a plane which is symmetrical with an optical plane in which the image-reading light is reflected by the reflecting mirror toward the original, with respect to a plane perpendicular to the original. In this case, each of the light detecting elements detects the reflected light with high intensity.

In another embodiment of the present invention, the light detecting device further comprises at least one converging lens which is provided between the original and the light detecting elements and which converges the image-reading light reflected from the original and permits the converged image-reading light to be incident to each of the light detecting elements. In this case, each of the light detecting elements detects the converged light with high intensity.

In another embodiment of the present invention, the light detecting elements are provided along a straight line extending substantially parallel to a scanning direction in which the image-reading light emitted by the light emitting device scans the original. In this case, each of the light detecting elements detects the light reflected from the original, under the same conditions. Accordingly, the output of each light detecting element need not be corrected.

In another embodiment of the present invention, the light detecting elements comprise at least three light detecting elements. The three or more light detecting elements may be provided at a regular interval of distance along the straight line.

In another embodiment of the present invention, the optical scanner further comprises a feeding device which moves the original in a direction perpendicular to the scanning direction. The original may be supported on a support surface of an original-supporting member.

In another embodiment of the present invention, the each of the light detecting elements is associated with an entirety of the original and detects the image-reading light reflected from the entirety of the original. The each of the light detecting elements may produce an electric signal indicative of a detected intensity of the image-reading light reflected from the entirety of the original, and the light detecting device may further comprise a calculator which sums respective magnitudes of the electric signals produced by the light detecting elements, with respect to the each of the positions on the original. In this case, the light detecting device detects more uniform light intensities for all the positions on the original and accordingly detects the original image with higher accuracy. In addition, even if one of the light detecting elements fails, the other element or elements can read the image, thereby compensating for the failure of one element to some degree.

In another embodiment of the present invention, the each of the light detecting elements is associated with a corresponding one of a plurality of parts of the original and detects the image-reading light reflected from the corresponding one part of the original. The each of the light detecting elements may produce an electric signal indicative of a detected intensity of the image-reading light reflected from the one part of the original, and the light detecting device may further comprise a calibrator which calibrates the each of the light detecting elements such that the each light detecting element produces an electric signal having a same magnitude as that of the electric signals produced by the other light detecting elements, when the each light detecting element detects a same intensity of the image-reading light reflected from the original as that of the image-reading light reflected from the original and detected by the other light detecting elements. In this case, the light detecting elements can read the original image with high accuracy. In addition, since the number of the light detecting elements of the light detecting device may be much smaller than that of a prior line sensor, the present optical scanner costs low.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which.

DETAILED DESCRIPTION OF THE PREFERRED EMBODIMENTS

Figure 1:
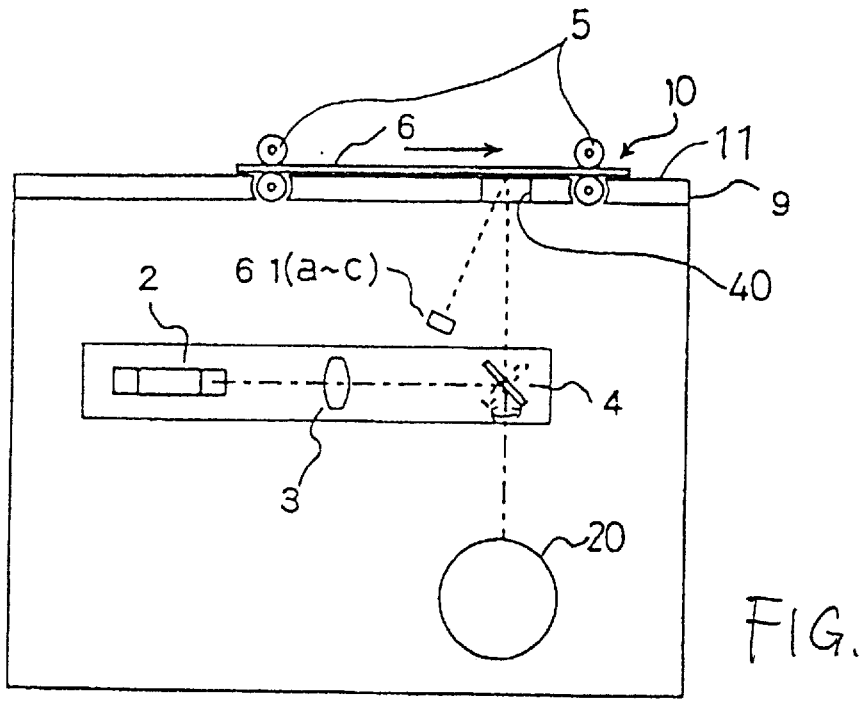
FIG. 1 is a view of a copying machine including an optical scanner as an image-reading device to which the present invention is applied.
Figure 2A:
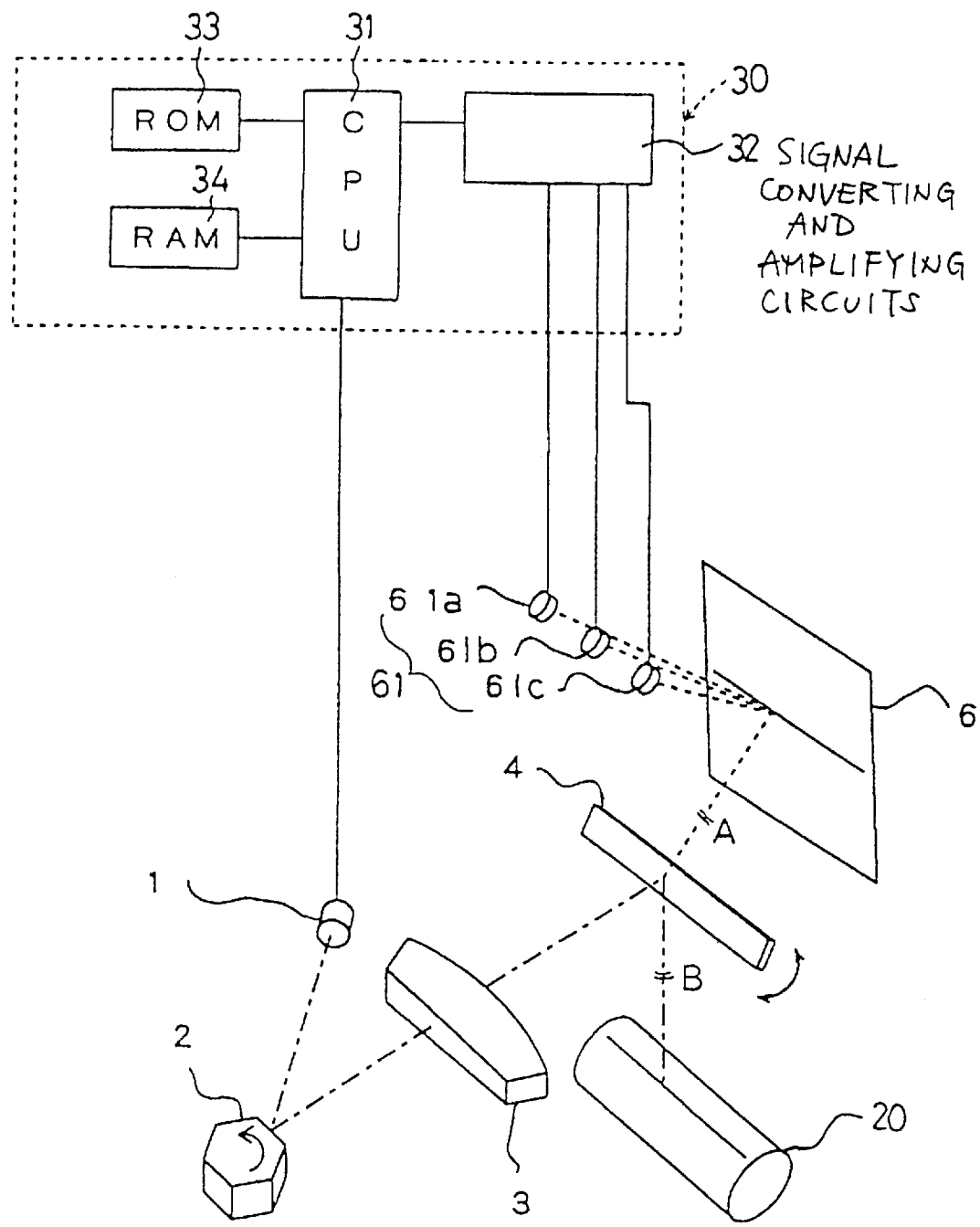
FIG. 2A is an illustrative view of the optical scanner of FIG. 1.

Referring first to FIG. 1, there is shown a copying machine including an optical scanner to which the present invention is applied. FIG. 2A shows the optical scanner in detail.

The copying machine includes an image-reading device which includes a semiconductor laser 1 as a light source; a rotary polygon mirror 2 as a light deflector which continuously changes the direction of a laser beam emitted from the laser 1; an image-forming lens 3 as a light converger which converges the light beam deflected by the polygon mirror 2; a reflecting mirror 4 as a selector which selectively reflects the light converged by the image-forming lens 3, to an original 6, or to a photosensitive body 20 which will be described later; an original-feeding device 10 which supports and feeds the original 6 in a direction indicated at arrow; three light detecting elements 61*a*, 61*b*, 61*c* as a light detecting device 61 which detects the light reflected from the original 6 and reads an original image carried on the original 6; and a control device 30 which controls the operation of the copying machine as a whole.

The control device 30 includes a central processing unit (CPU) 31 which controls the semiconductor laser 1 to emit a light beam and stop emitting the light beam. The laser 1 is disposed behind the polygon mirror 2 as seen in FIG. 2. The reflecting mirror 4 is disposed in an optical plane which starts from the polygon mirror 2 and passes through the image-forming lens 3. The reflecting mirror 4 is rotatable by an electric motor (not shown), in directions indicated at arrows in FIG. 2A. The original-feeding device 10 includes an original-supporting member 9 having an original-supporting surface 11 on which the original 6 is placed, and two pairs of rollers 5 each of which pinches the original 6 and which cooperate with each other to feed the original 6 in the direction indicated at arrow. The original-supporting member 9 has an opening 40 which permits the light reflected by the reflecting mirror 4, to pass therethrough so as to irradiate the original 6. The opening 40 may be filled with a transparent material such as glass or resin.

Figure 2B:
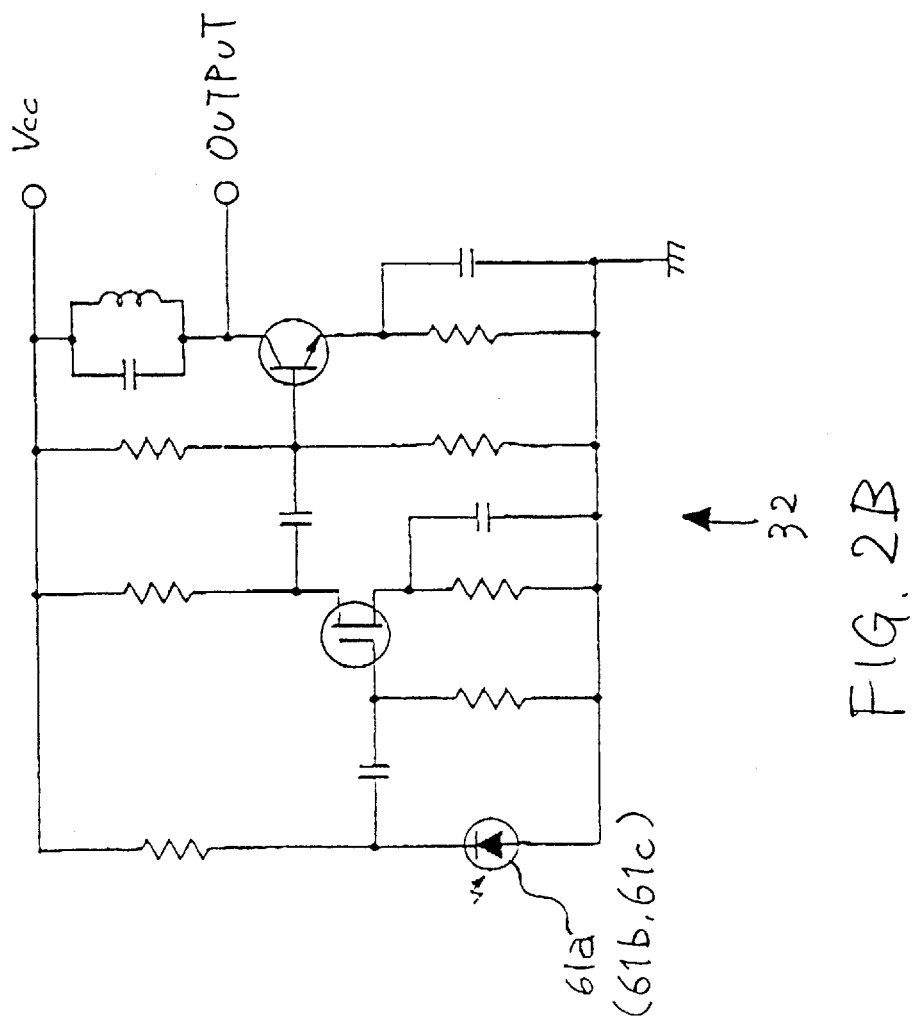
FIG. 2B is a view of a signal converting and amplifying circuit of a control device of the optical scanner of FIG. 2A.

The light detecting device 61 includes, as the three light detecting elements 61a, 61b, 61c, three photodiodes each of which converts a received light energy to an electric current. The light detector 61 is disposed on the side of the original feeder 10 with respect to the reflecting mirror 4. The three photodiodes 61a, 61b, 61c are equidistant from each other, i.e., are provided at a regular interval of distance, in a direction parallel to a main scanning direction in which the original 6 is scanned with the light reflected from the mirror 4. The main scanning direction is perpendicular to the secondary scanning direction in which the original 6 is fed by the original feeder 10. As shown in FIG. 2B, each of the three photodiodes 61a, 61b, 61c is electrically connected to a signal converting and amplifying circuit 32 which converts an electric current as an output of the corresponding photodiode 61a, 61b, 61c, into an electric voltage, amplifies the electric voltage, and supplies the amplified voltage as an output thereof, to the CPU 31.

The control device 30 additionally includes a random access memory (RAM) 34 which temporarily stores data indicative of the electric voltages supplied from each of the three photodiodes 61a, 61b, 61c via the respective circuits 32; and a read only memory (ROM) 33 which stores control programs according to which the CPU 31 controls the operation of the copying machine as a whole, in particular, the semiconductor laser 1, the electric motor for rotating the reflecting mirror 4, an electric motor (not shown) for rotating the pairs of rollers 5 of the original-feeding device 10, an electric motor (not shown) for rotating the rotary polygon mirror 2, and an electric motor (not shown) for rotating a photoconductive drum 20 which will be described later.

The present copying machine additionally includes an image-recording device which includes the semiconductor laser 1; the polygon mirror 2; the image-forming lens 3; the reflecting mirror 4; and the photoconductive drum 20 on which an electrostatic latent image is formed by being irradiated with the light reflected by the reflecting mirror 4.

The photoconductive drum 20 is controlled by the CPU 31 in such a way that the drum 20 is rotated by a predetermined angular amount each time one line having a width corresponding to the predetermined angular amount of the drum 20 and to the diameter of light spot reflected by the reflecting mirror 4 and incident to the drum 20, is scanned in a main scanning direction perpendicular to a direction in which an outer circumferential surface of the drum 20 is moved.

Next, there will be described in detail the operation of the light detecting device 61 as an essential part of the copying machine, by reference to FIGS. 3, 4, 5, and 6.

Figure 3:
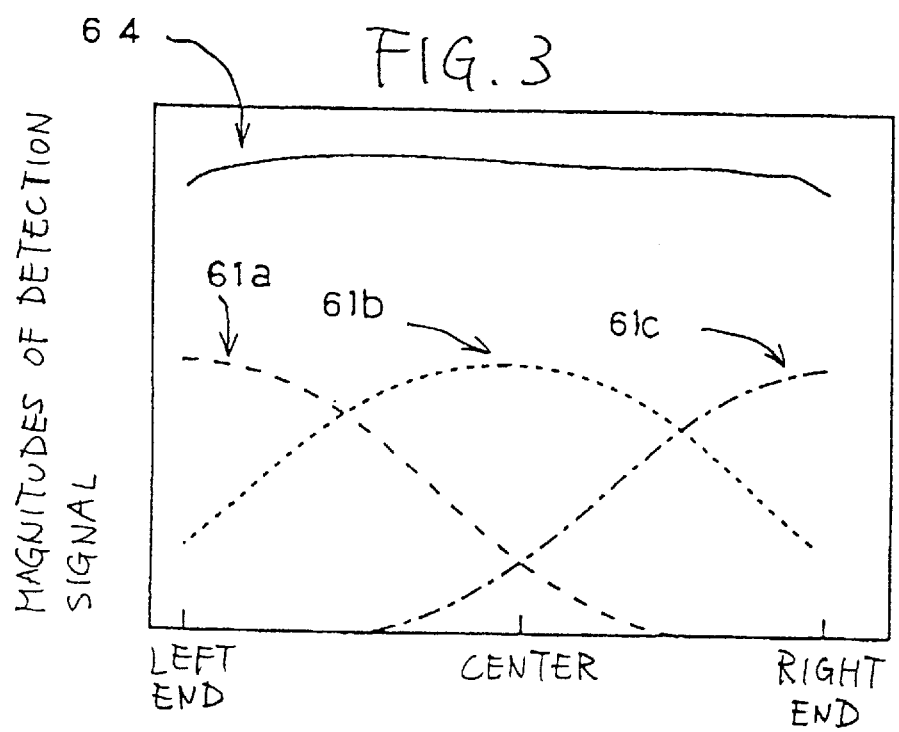
FIG. 3 is a graph showing a composite signal characteristic curve provided by three light detecting elements of the optical scanner of FIG. 2A.

FIG. 3 shows a relationship between positions (or picture elements) on an A4-size original 6 ("A4" is one of cut-sheet sizes in accordance with Japanese Industrial Standards, JIS) and magnitudes of the output or detection signal of each photodiode 61a, 61b, 61c. A magnitude of detection signal is indicative of a difference obtained by subtracting a light intensity detected by each photodiode 61a, 61b, 61c at an image position or picture element on the original 6, from a light intensity detected by the same 61a, 61b, 61c at an image-free position or picture element on the original 6. In FIG. 3, reference numerals 61a, 61b, 61c designate respective curves indicative of the magnitudes of detection signals produced by the first to third photodiodes 61a, 61b, 61c, respectively, and reference numeral 64 designates a curve as a sum of the three curves 61a, 61b, 61c.

Figure 4:
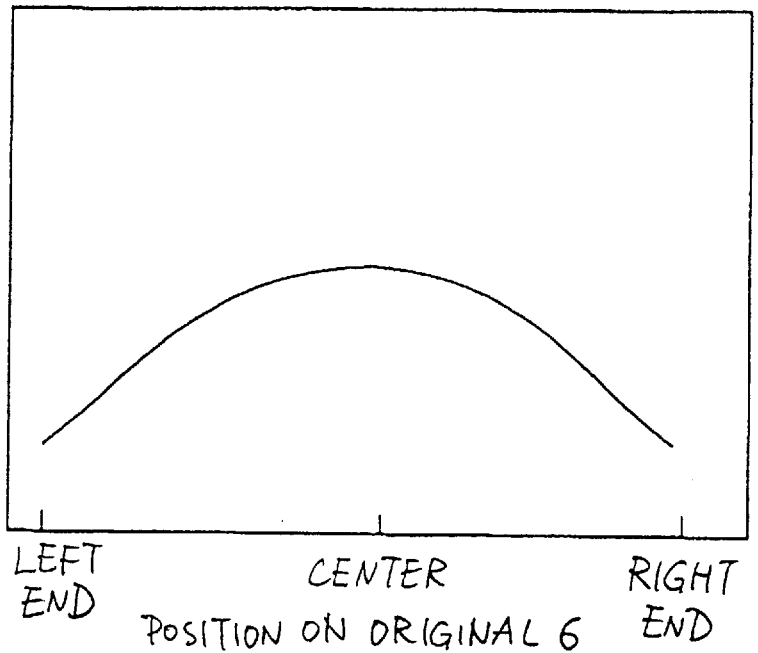
FIG. 4 is a graph showing a signal characteristic curve provided by a single light detecting element.
Figure 5:
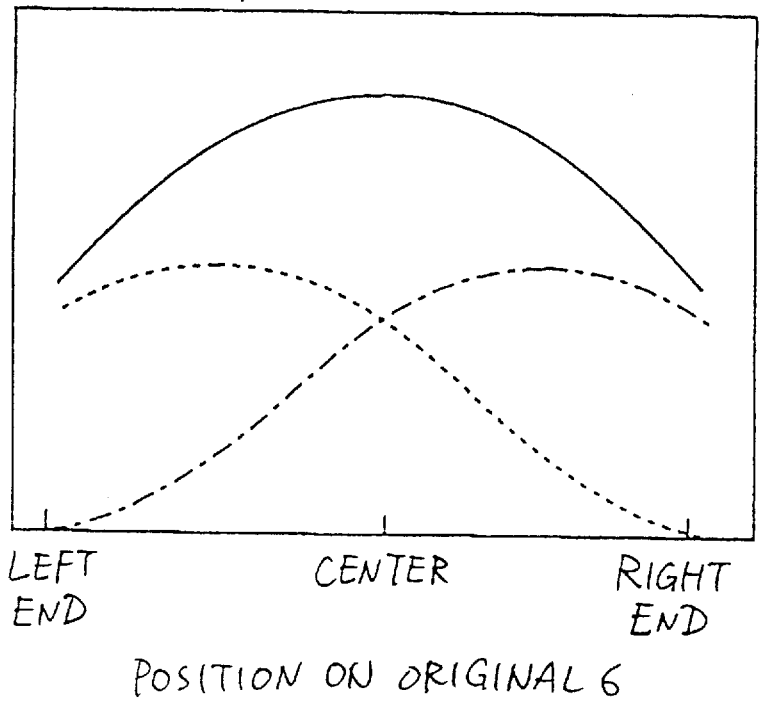
FIG. 5 is a graph showing a composite signal characteristic curve provided by two light detecting elements employed in another optical scanner as a second embodiment of the present invention.
Figure 6:
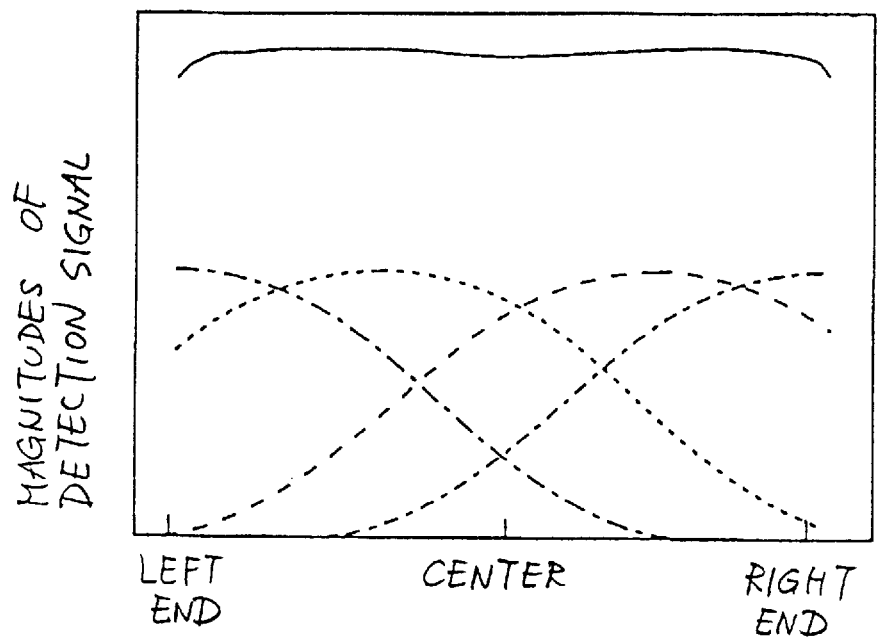
FIG. 6 is a graph showing a composite signal characteristic curve provided by four light detecting elements employed in another optical scanner as a third embodiment of the present invention.

FIG. 4 shows a curve obtained in the case where only the second photodiode 61A is employed and the other two photodiodes 61b, 61c are omitted; FIG. 5 shows two individual curves and a composite curve obtained in the case where only the first and third photodiodes 61a, 61c are employed and the central photodiode 61b is omitted; and FIG. 6 shows four individual curves and a composite curve obtained in the case where the first and third photodiodes 61a, 61c are employed and additionally two intermediate photodiodes are employed in place of the central photodiode 61b.

As can be understood from FIGS. 3 to 6, a more flat curve, i.e., more uniform magnitudes of detection signal can be obtained by employing a greater number of photodiodes 61a, 61b, 61c. In particular, as is apparent from FIG. 3, the three photodiodes 61a, 61b, 61c which are best positioned with respect to one another and with respect to the original 6 cooperate with one another to provide a substantially uniform magnitude of detection signal with respect to the entire surface of the original 6. Thus, it is not necessary to employ an excessively great number of photodiodes. In the present embodiment, since the light reflected from the original 6 is detected by a plurality of light-receiving elements 61a, 61b, 61c which are best positioned with respect to the original 6, the copying machine can obtain, as image data, a substantially uniform magnitude of detection signal with respect to all the positions on the original 6, without needing a line sensor which has been employed in the conventional image reading techniques.

The CPU 31 of the control device 30 identifies whether each position or picture element on the original 6 is white or black, based on the magnitude of detection signal corresponding to that position. Each time one line of positions on the original 6 is scanned in the main scanning direction using the light spot reflected by the reflecting mirror 4, the CPU 31 produces image data corresponding to each one line of positions. This operation is repeated as the original 6 is fed forward, until all lines of positions on the original 6 are scanned and the CPU 31 produces image data corresponding to all the positions on the original 6. The image data may be provided by sets of binary data each of which is indicative of 0 or 1. However, the CPU 31 may be adapted to convert each magnitude of detection signal into one of three or more values, i.e., gray scale values. In the latter case, image data obtained by the CPU 31 may be provided by sets of gray-scale data each of which is indicative of one of three or more values.

Next, there will be described the operation of the optical scanner constructed as described above. In the image-reading operation of the copying machine, first, the reflecting mirror 4 is rotated to a predetermined angular position indicated at broken lines in FIG. 2A, by the electric motor (not shown) under control of the control device 30. Subsequently, the CPU 31 of the control device 30 continues to drive the light source 1 to emit a light beam, until an end position on the original 6 passes over the opening 40 of the original-supporting member 9. The light beam emitted from the light source 1 is incident to, and deflected by, the polygon mirror 2 which is being rotated at a uniform angular speed. The light beam deflected by the polygon mirror 2 is incident to, and converged by, the image-forming lens 3, so that the converged light is incident to the reflecting mirror 4. Thus, the light is reflected by the mirror 4, toward the opening 40 of the original-supporting member 9, and the reflected light irradiates one line of positions of the original 6 which are being just located over the opening 40. The light reflected from the original 6 is returned to the inside of the copying machine through the opening 40. When a light is reflected by an "imaged" position or picture element on the original 6, the light energy is largely absorbed by the image, and the light intensity is significantly lowered; on the other hand, when a light is reflected by an "image-free" position on the original 6, the light energy is not absorbed so much, and each photodiode 61a, 61b, 61c detects a significantly higher light intensity than the intensity of light reflected from the "imaged" position.

Each of the photodiodes 61a, 61b, 61c detects either a low or a high light intensity with respect to each of the positions (i.e., picture elements) on the original 6, while each line of positions are irradiated with the light spot converged by the image-forming lens 3 and reflected by the reflecting mirror 4. The signal converting and amplifying circuit 32 connected to each photodiode 61a, 61b, 61c converts the electric current as the output of the photodiode, into an electric voltage which in turn is supplied to the CPU 31. The CPU 31 calculates, with respect to each of the positions on the original 6, a sum of respective magnitudes of the three electric voltages supplied from the three circuits 32 connected to the three photodiodes 61a, 61b, 61c. The CPU 31 stores, as image data indicative of the original image on the original 6, data indicative of the summed magnitudes corresponding to all the positions on the original 6, in the RAM 34. Therefore, in the case where the present optical scanner is used to read an original 6 having no image thereon, the CPU 31 produces image data indicative of a substantially uniform summed magnitude with respect to all positions on the original.

In the image recording operation of the copying machine, first, the reflecting mirror 4 is rotated to a predetermined angular position indicated at solid lines in FIG. 1, by the electric motor under control of the CPU 31. Subsequently, based on the image data stored in the RAM 34, the CPU 31 drives the light source 1 to emit the light beam and stop emitting the light beam, depending upon whether each set of picture-element data in the image data is indicative of an "imaged" position or an "image-free" position.

In the case where the present optical scanner is employed in a laser printer, the CPU 31 may be adapted to use image data supplied from a computer, for recording images corresponding to the image data; in the case where the present optical scanner is employed in a facsimile machine, the CPU 31 may be adapted to use image data transmitted from another facsimile machine, for the same purpose; and in the case where the present optical scanner is employed in a composite machine having the copying, printing, and facsimile functions, the CPU 31 may be adapted to select and use one of the sorts of image data which are read from an original 6, supplied from a computer, and transmitted from another facsimile machine.

The light beam emitted from the light source 1 is incident to, and deflected by, the polygon mirror 2 which is being rotated at a uniform angular speed. The light beam deflected by the polygon mirror 2 is incident to, and converged by, the image-forming lens 3, so that the converged light is incident to the reflecting mirror 4. Thus, the light is reflected by the mirror 4, toward the photosensitive body 20, so that an electrostatic latent image corresponding to the image data is formed on the body 20.

The photosensitive body 20 is positioned relative to the reflecting mirror 4 such that a length of the optical path of the light between the mirror 4 and the body 4 is equal to a length of the optical path of the light between the mirror 4 and the original 6. Therefore, the range of scanning on the original 6 is equal to the range of scanning on the photosensitive body 20. In the case where the size of the original 6 read by the present optical scanner is equal to the size of a recording sheet on which the latent image formed on the body 20 is recorded, the image data stored in the RAM 34 can directly be used to record the image, without needing any special data processing. Thus, the image recording operation is easily carried out.

As is apparent from the foregoing description, in the present optical scanner, the three light detecting elements 61a, 61b, 61c are employed to read the original image, and each light detecting element 61a, 61b, 61c is associated with the entirety of the original 6 to detect the light reflected from the entirety of the original 6. The original 6 includes a plurality of positions or picture elements thereon. Therefore, the accuracy of reading of the original image from the original 6 is improved as compared with the case where a single light detecting element is employed to read the original 6 as a whole. In addition, since the number of the light detecting elements 61a, 61b, 61c employed is much smaller than that of light detecting elements employed in a prior line sensor, the production cost of the present optical scanner is lowered.

In addition, in the first embodiment shown in FIG. 1, the original image carried on the original 6 is read by operating the light source 1 to emit a light beam toward the polygon mirror 2 being rotated. The polygon mirror 2 deflects the light beam, and the deflected light beam is incident to the image-forming lens 3 which converges the light beam, so that the converged light irradiates each of different positions on the original 6 at a corresponding one of different times, i.e., continuously scans the original 6 from the right end to the left end thereof. The control device 30 or the CPU 31 calculates the sum of respective magnitudes of the electric signals which are produced by the three photodiodes 61a, 61b, 61c when each of the positions on the original 6 is irradiated with the converged light at a corresponding one of the times. Therefore, as indicated in the graph of FIG. 3, when the present optical scanner reads an original having no image thereon, i.e., having a background color only, the optical scanner provides a substantially uniform summed signal magnitude with respect to each of positions (or picture elements) on the original.

In the first embodiment, the semiconductor laser 1 is used as the light source. The laser 1 may be a solid-state laser such as a YAG (yttrium aluminum garnet) laser that emits a directional light beam. A non-linear optical element may additionally be employed to shorten the wavelength of the light beam emitted by the laser. In the latter case, the optical scanner can easily read an original carrying an original image printed in red.

Figure 7:
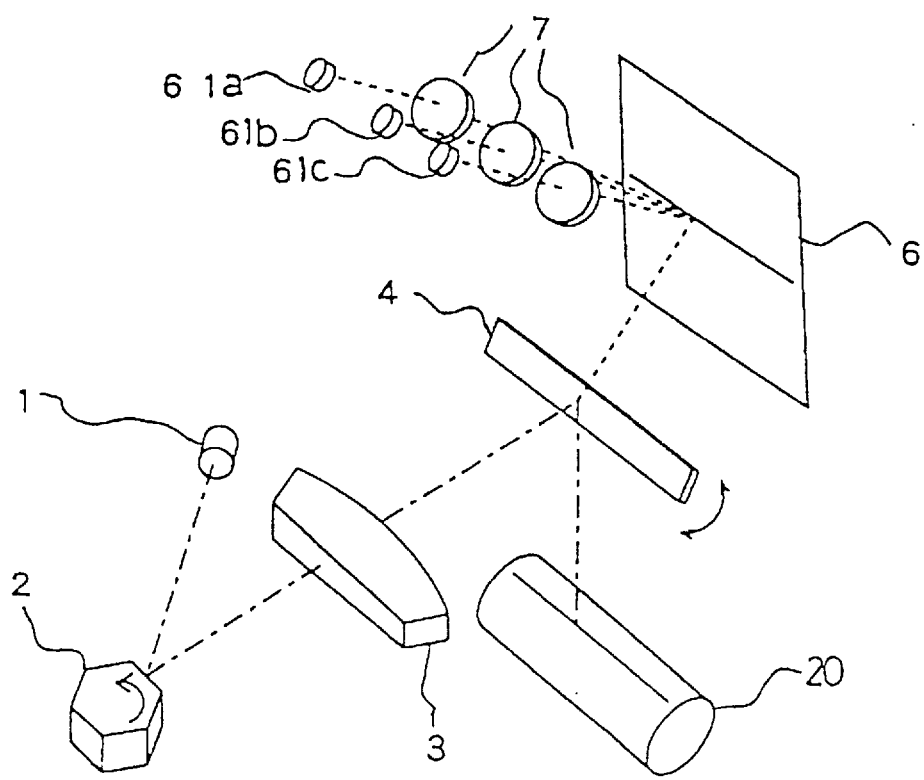
FIG. 7 is a view corresponding to FIG. 2A, showing another optical scanner as a fourth embodiment of the present invention.

Referring next to FIG. 7, there is shown another optical scanner as a fourth embodiment of the present invention.

The optical scanner as the fourth embodiment shown in FIG. 7 is different from the optical scanner as the first embodiment shown in FIG. 1 in that the fourth embodiment additionally includes a light-converging lens 7 between an original 6 and each of three photodiodes 61a, 61b, 61c. The three light-converging lenses 7 are provided in an optical plane in which the light reflected from the original 6 travels, and each lens 7 converges or collects the light reflected from the original 6 so that the collected light is incident to a corresponding one of the photodiodes 61a, 61b, 61c. Signal converting and amplifying circuits 32 connected to the photodiodes 61a, 61b, 61c, respectively, need a longer time to convert the light detected by each photodiode, into an electric current, as the light-detecting area of each photodiode increases. Because of the provision of the light-converging lenses 7, the respective light-detecting areas of the photodiodes 61a, 61b, 61c are decreased and the converting speed of the circuits 32 are increased. The same number of light-converging lens 7 as the number of the photodiodes 61a, 61b, 61c may be replaced by a single light-converging lens 7.

Figure 8:
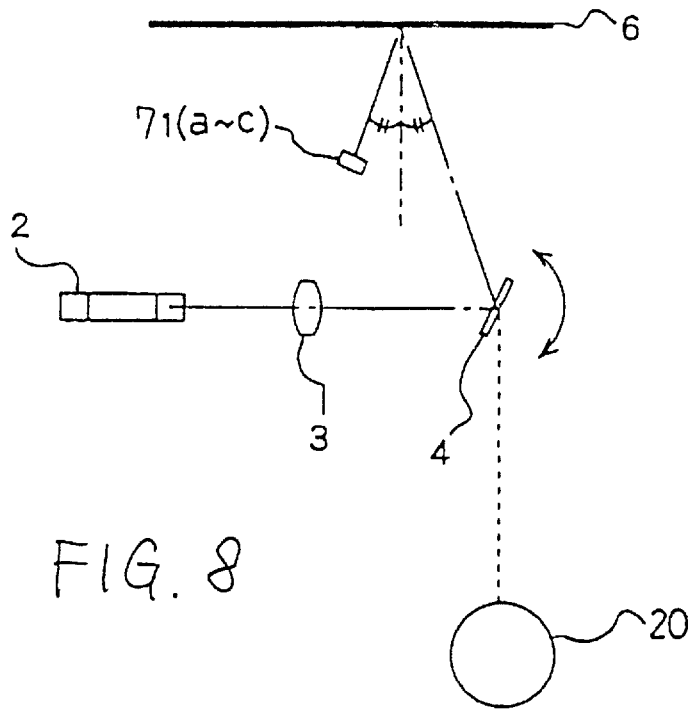
FIG. 8 is a view showing another optical scanner as a fifth embodiment of the present invention.

Referring next to FIG. 8, there is shown another optical scanner as a fifth embodiment of the present invention. A light detecting device 71 (71a, 71b, 71c) is provided in a plane which is symmetrical with an optical plane in which the light reflected by a reflecting mirror 4 travels toward an original 6, with respect to a plane perpendicular to the original 6. In this embodiment, each of the light detecting elements 71a, 71b, 71c detects the light which is reflected from the original 6 and which has a high intensity. Thus, the present optical scanner reads images with high efficiency.

Figure 9:
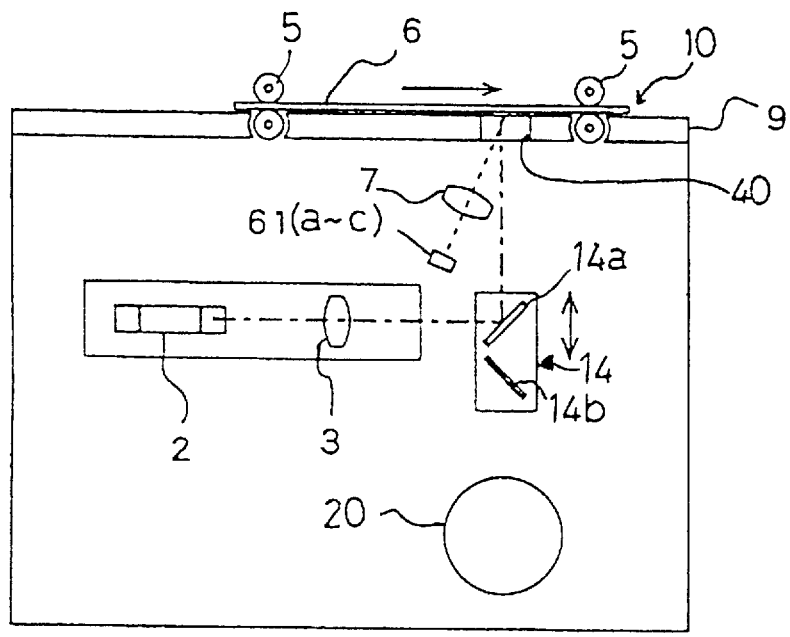
FIG. 9 is a view corresponding to FIG. 1, showing another copying machine including another optical scanner as a sixth embodiment of the present invention.

Referring further to FIG. 9, there is shown another optical scanner as a sixth embodiment of the present invention. This optical scanner has a mirror device 14 including a first reflecting mirror 14a which reflects an image-reading light converged by an image-forming lens 3, toward an original 6, and a second reflecting mirror 14b which reflects an image-forming light converged by the image-forming lens 3, toward a photosensitive body 20; and a drive device (e.g., an electric motor, not shown) which selectively moves each of the first and second reflecting mirrors 14a, 14b to an operative position thereof prescribed in an optical plane in which the image-reading or image-forming light converged by the lens 3 travels. When the optical scanner reads the original 6, the drive device is operated by a control device 30 to move the mirror device 14 downward so that the first mirror 14a is moved to the operative position; and when the optical scanner forms a latent image on the drum 20, the drive device moves the mirror device 14 upward so that the second mirror 14b is moved to the operative position. In the sixth embodiment, the optical scanner is free from the problem with the first embodiment shown in FIG. 1 that the single reflecting mirror 4 may not be rotated by an accurate angular amount to one or each of the two predetermined angular positions corresponding to the image-reading and image-forming operations.

In the sixth embodiment shown in FIG. 9, the first and second reflecting mirrors 14a, 14b of the mirror device 14 may be positioned side by side in a direction perpendicular to the drawing sheet of FIG. 9. In the latter case, a drive device is employed which moves the mirror device 14 in the perpendicular direction.

Figure 10:
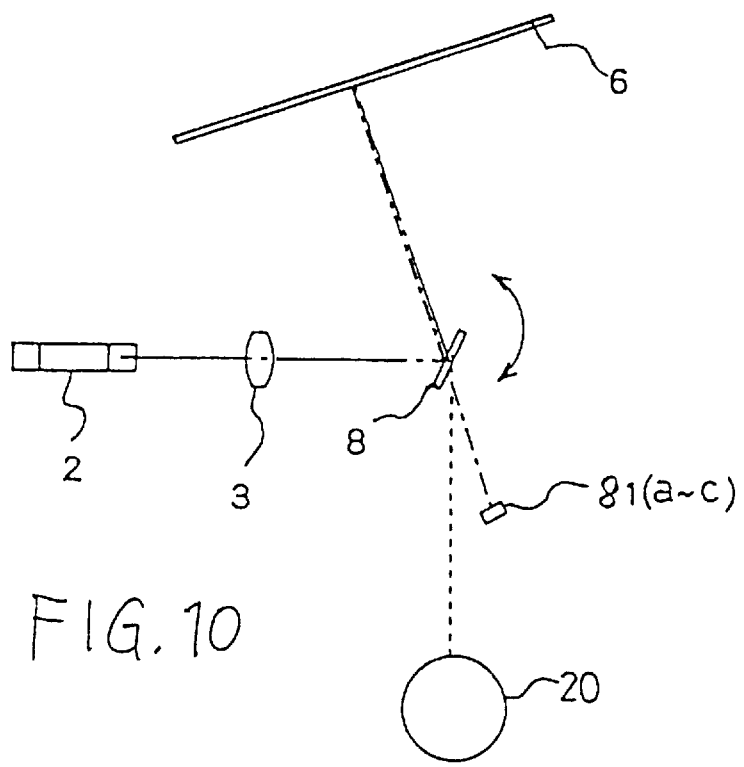
FIG. 10 is a view showing another optical scanner as a seventh embodiment of the present invention.
Figure 12:
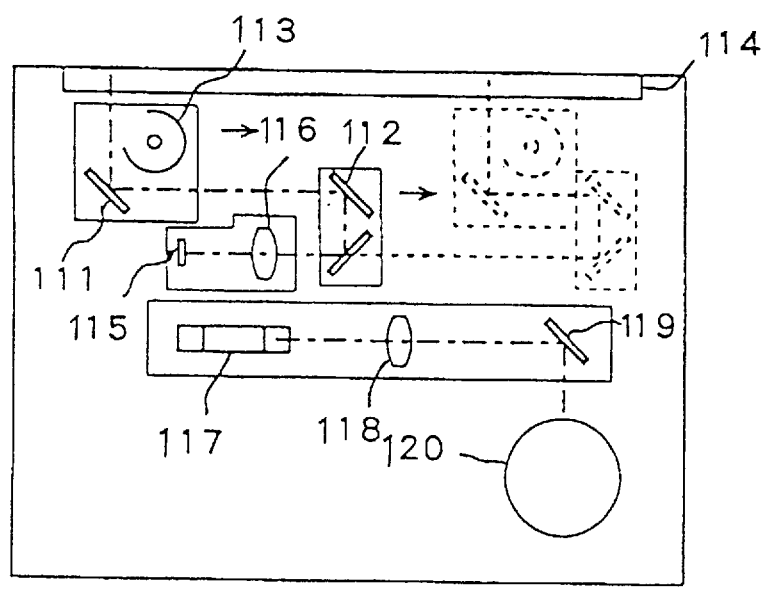
FIG. 12 a view of a copying machine including a conventional image-reading device.

Referring next to FIG. 10, there is shown another optical scanner as a seventh embodiment of the present invention. In this embodiment, the reflecting mirror 4 employed in the first embodiment shown in FIG. 1 is replaced by a half mirror 8 which permits a portion of the light reflected from an original 6 and incident thereto, to pass therethrough so as to be detected by a light detecting device 81, i.e., each of three photodiodes 81a, 81b, 81c. The photodiodes 81a, 81b, 81c are provided at respective positions which are opposite to the original 6 with respect to the half mirror 8. The light reflected from the half mirror 8 is perpendicularly incident to the original 6, and a portion of the light perpendicularly reflected from the original 6 is transmitted by the half mirror 8, so that the transmitted light is detected by each of the photodiodes 81a, 81b, 81c. Thus, each photodiodes 81a, 81b, 81c produces an electric signal having a great magnitude.

Figure 11:
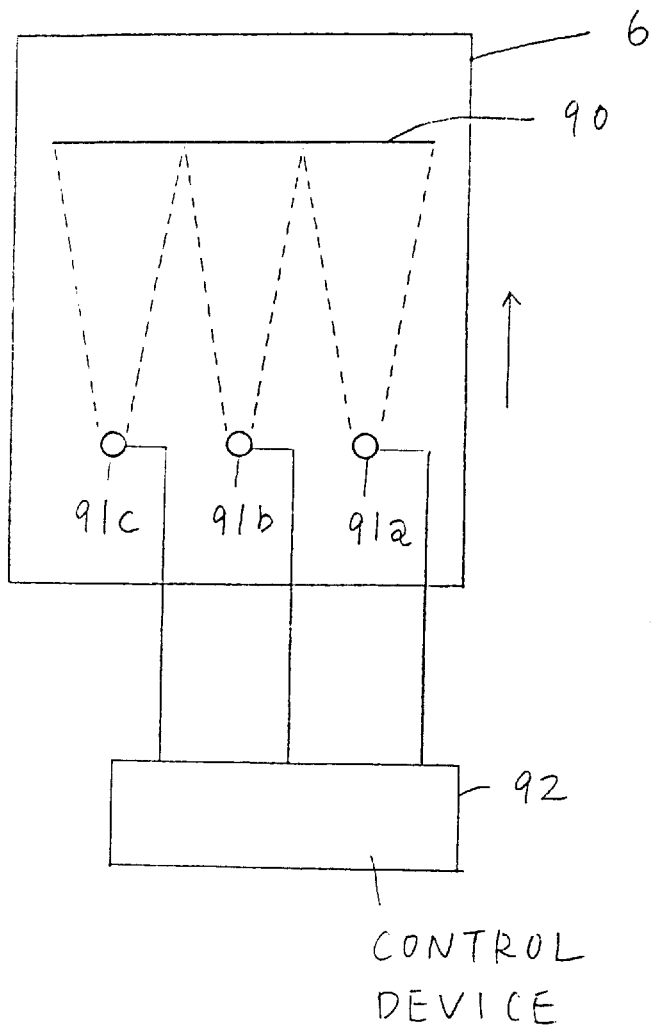
FIG. 11 is a view of another optical scanner as an eighth embodiment of the present invention.
Figure 13:
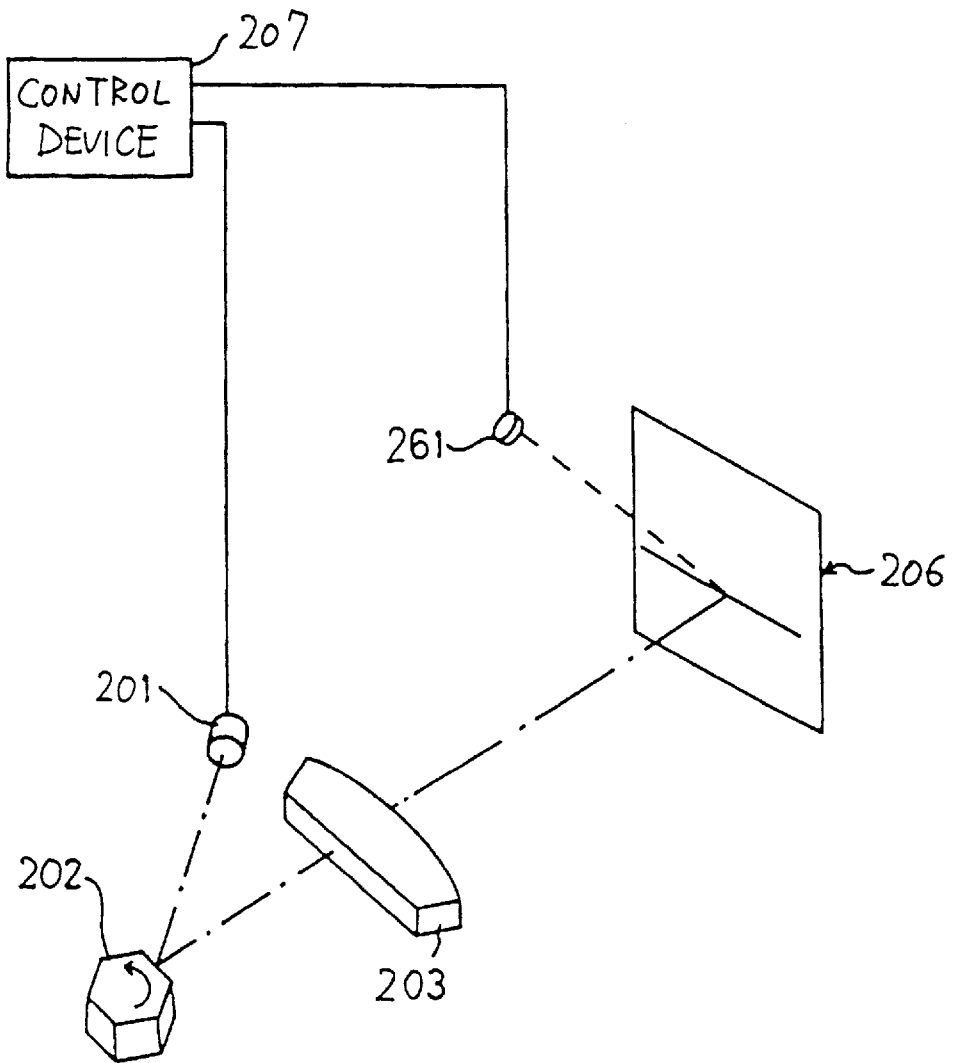
FIG. 13 is a view of another conventional image-reading device.

Referring next to FIG. 11, there is shown another optical scanner as an eighth embodiment of the present invention. The present optical scanner has a hardware construction similar to that of the first embodiment shown in FIG. 1. However, respective electric signals produced by three photodiodes 91a, 91b, 91c are processed by a control device 92 in a different manner. The control device 92 has three signal converting and amplifying circuits similar to those 32 employed in the first embodiment.

In the eighth embodiment, an image-scanning (or image-reading) line or range 90 along which the light reflected by a reflecting mirror 4 irradiates each line of positions or picture elements on an original 6 from a right-hand end to a left-hand end thereof, is divided into three regions with which the three photodiodes 91a, 91b, 91c are associated, respectively. When the light reflected from the mirror 4 irradiates each of positions in the first region on the side of the right-hand end, the control device 90 obtains the output of the first photodiode 91a only; when the light irradiates each of positions in the intermediate region of the image-scanning line or range 90, the control device 90 obtains the output of the second photodiode 91b only; and when the light irradiates each of positions in the third region on the side of the left-hand end, the control device 90 obtains the output of the third photodiode 91c only.

The respective outputs of the three photodiodes 91a, 91b, 91c correspond to the respective plateau portions of the three signal characteristic curves shown in FIG. 3. Thus, the control device 92 provides a substantially uniform signal magnitude with respect to each of the positions on the original 6, if the original 6 has no image thereon.

However, in the case where the three photodiodes 91a, 91b, 91c have different output characteristics, the photodiodes 91a, 91b, 91c may provide different signal magnitudes with respect to a same imaged or image-free position (picture element) on the original 6. Hence, the control device 92 calibrates the photodiodes 91a, 91b, 91c such that each photodiode 91a, 91b, 91c produces an electric signal having the same magnitude as that of the electric signals produced by the other photodiodes, when each photodiode detects the same intensity of the light reflected from the original 6 as that of the light reflected from the original 6 and detected by the other photodiodes. For example, this calibration may be carried out by operating the optical scanner to read two originals which have no image thereon and have different background colors, e.g., white and black and, based on the outputs of the photodiodes 91a, 91b, 91c obtained from the two originals, calibrating the outputs of the photodiodes 91a, 91b, 91c such that the photodiodes 91a, 91b, 91c produces respective electric signals having a same magnitude for each of the two originals. In this embodiment, the control device 92 functions as a calibrator for the photodiodes 91a, 91b, 91c.

The calibration carried out in the eighth embodiment shown in FIG. 11 may be done for the photodiodes 61a, 61b, 61c of the light detecting device 61 employed in the first embodiment shown in FIG. 1.

While the present invention has been described in its preferred embodiments, it is to be understood that the present invention may be embodied with other changes, improvements, and modifications that may occur to those skilled in the art without departing from the scope and spirit of the invention defined in the appended claims.

What is claimed is:

1. An optical scanner comprising:
   a light emitting device which emits an image-reading light toward an original having an original image thereon, such that the image-reading light scans the original by irradiating each of a plurality of positions on at least one straight line on the original at a corresponding one of a plurality of times;
   a light detecting device which detects the image-reading light reflected from the original and thereby reads the original image thereon, said light detecting device including a plurality of light detecting elements each of which is associated with at least a part of the original and detects an intensity of the image-reading light reflected from said part of the original, said part of the original including a plurality of positions on the original, the respective image-reading lights detected by said plurality of light detecting elements having identical optical characteristics except the light intensity; and
   a feeding device which moves at least one of the original and the light detecting device relative to each other in a feeding direction substantially perpendicular to said straight line.

2. An optical scanner according to claim 1, wherein said each of said light detecting elements produces an output indicative of the detected image-reading light, and wherein said light detecting device further comprises a data producing device which produces image data representative of the read original image, said image data comprising data indicative of said output of said each of said light detecting elements in relation with said each of said positions on the original.

3. An optical scanner according to claim 1, wherein said light emitting device comprises a light source which emits the image-reading light; a light deflector which deflects the image-reading light emitted by said light source, toward the original, such that the image-reading light scans the original; and a light converger which converges the image-reading light deflected by said light deflector, so that the converged image-reading light irradiates said each of said positions on the original.

4. An optical scanner according to claim 3, further comprising:
   a memory device which stores image data representative of the original image read by said light detecting device;
   a photosensitive body; and
   a control device which controls, according to the image data stored in said memory device, said light source to emit an image-forming light toward said photosensitive body via said light deflector and said light converger, so that a latent image corresponding to the original image is formed on the photosensitive body.

5. An optical scanner according to claim 4, further comprising a selector which is provided in an optical plane in which each of the image-reading and image-forming lights converged by said light converger passes, said selector selectively directing the image-reading light toward the original and the image-forming light toward said photosensitive body.

6. An optical scanner according to claim 5, wherein said selector comprises at least one reflecting mirror which selectively reflects the image-reading light toward the original and the image-forming light toward said photosensitive body.

7. An optical scanner according to claim 6, wherein said selector further comprises a drive device which rotates said reflecting mirror to each of two angular positions at one of which the mirror reflects the image-reading light toward the original and at the other of which the mirror reflects the image-forming light toward said photosensitive body.

8. An optical scanner according to claim 6, wherein said reflecting mirror comprises a half mirror which permits a portion of the image-reading light reflected from the original and incident thereto, to pass therethrough so as to be detected by said light detecting device.

9. An optical scanner according to claim 6, wherein said selector comprises, as said at least one reflecting mirror, a first reflecting mirror which reflects the image-reading light toward the original and a second reflecting mirror which reflects the image-forming light toward said photosensitive body; and a drive device which selectively moves each of said first and second reflecting mirrors to an operative position thereof in said optical plane.

10. An optical scanner according to claim 6, wherein said photosensitive body is positioned relative to said reflecting mirror such that a length of an optical path of the image-forming light between the mirror and the photosensitive body is equal to a length of an optical path of the image-reading light between the mirror and the original.

11. An optical scanner according to claim 6, wherein said light detecting device is provided in a plane which is symmetrical with an optical plane in which the image-reading light is reflected by said reflecting mirror toward the original, with respect to a plane perpendicular to the original.

12. An optical scanner according to claim 1, wherein said light detecting device further comprises at least one converging lens which is provided between the original and said light detecting elements and which converges the image-reading light reflected from the original and permits the converged image-reading light to be incident to each of the light detecting elements.

13. An optical scanner according to claim 1, wherein said light detecting elements are provided along a straight line extending substantially parallel to a scanning direction in which the image-reading light emitted by said light emitting device scans the original.

14. An optical scanner according to claim 13, wherein said light detecting elements comprise at least three light detecting elements.

15. An optical scanner according to claim 14, wherein said at least three light detecting elements are provided at a regular interval of distance along said straight line.

16. An optical scanner according to claim 13, wherein said feeding device comprises an original feeding device which moves the original in said feeding direction substantially perpendicular to said scanning direction.

17. An optical scanner according to claim 1, wherein said each of said light detecting elements is associated with an entirety of the original and detects the image-reading light reflected from said entirety of the original.

18. An optical scanner according to claim 17, wherein said each of said light detecting elements produces an electric signal indicative of a detected intensity of the image-reading light reflected from said entirety of the original, and wherein said light detecting device further comprises a calculator which sums respective magnitudes of the electric signals produced by said light detecting elements, with respect to said each of said positions on the original.

19. An optical scanner according to claim 1, wherein said each of said light detecting elements is associated with a corresponding one of a plurality of parts of the original and detects the image-reading light reflected from said corresponding one part of the original.

20. An optical scanner according to claim 19, wherein said each of said light detecting elements produces an electric signal indicative of a detected intensity of the image-reading light reflected from said one part of the original, and wherein said light detecting device further comprises a calibrator which calibrates said each of said light detecting elements such that said each light detecting element produces an electric signal having a same magnitude as that of the electric signals produced by the other light detecting elements, when said each light detecting element detects a same intensity of the image-reading light reflected from the original as that of the image-reading light reflected from the original and detected by said other light detecting elements.

21. An optical scanner comprising:

a light-beam emitting device which emits an image-reading light beam toward an original having an original image thereon, such that the image-reading light beam scans the original by irradiating each of a plurality of positions on at least one first straight line on the original at a corresponding one of a plurality of times;

a light detecting device which detects an image-reading light reflected from the original and thereby reads the original image thereon, said light detecting device including a plurality of light detecting elements which are provided along a second straight line parallel to said first straight line and each of which is associated with at least a part of the original and detects an intensity of the image-reading light reflected from said each position on said first straight line on said part of the original; and a feeding device which moves at least one of the original and the light detecting device relative to each other in a feeding direction substantially perpendicular to said first straight line.

22. An optical scanner comprising:

a light emitting device which emits an image-reading light toward an original having an original image thereon, such that the image-reading light scans the original by irradiating each of a plurality of positions on the original at a corresponding one of a plurality of times; and a light detecting device which detects the image-reading light reflected from the original and thereby reads the original image thereon, said light detecting device including a plurality of light detecting elements each of which is associated with a corresponding one of a plurality of parts of the original and detects an intensity of the image-reading light reflected from said corresponding one part of the original, said one part of the original including at least two positions of said plurality of positions on the original, the respective image-reading lights detected by said plurality of light detecting elements having identical optical characteristics except the light intensity, said each of said light detecting elements producing an electric signal indicative of a detected intensity of the image-reading light reflected from said one part of the original, said light detecting device further including a calibrator which calibrates each of said light detecting elements such that each said light detecting element produces an electric signal having a same magnitude as electric signals produced by remaining ones of said light detecting elements, when each said light detecting element detects a same intensity of the image-reading light reflected from the original.

23. An optical scanner comprising:

a light-beam emitting device which emits an image-reading light beam toward an original having an original image thereon, such that the image-reading light beam scans the original by irradiating each of a plurality of positions on at least one first straight line on the original at a corresponding one of a plurality of times, said light-beam emitting device comprising a light source which emits the image-reading light beam; a polygon mirror which is rotatable for deflecting the light beam toward the original such that the light beam scans the original; and a light converger which converges the light beam deflected by the polygon mirror, to form an original-scanning light spot on the original; and a light detecting device which detects an image-reading light reflected from the original and thereby reads the original image thereon, said light detecting device including a plurality of light detecting elements which are provided along a second straight line parallel to said first straight line and each of which is associated with at least a part of the original and detects an intensity of the image-reading light reflected from said each position on said first straight line on said part of the original.

24. An optical scanner according to claim 23, further comprising a feeding device which moves at least one of the original and the light detecting device relative to each other in a feeding direction perpendicular to said first straight line, said light detecting elements of the light detecting device being provided along said second straight line perpendicular to said feeding direction.

25. An optical scanner comprising:

a light emitting device which emits an image-reading-light toward an original having an original image thereon, such that the image-reading light scans the original by irradiating each of a plurality of positions on the original at a corresponding one of a plurality of times; and a light detecting device which detects the image-reading light reflected from the original and thereby reads the original image thereon, said light detecting device comprising a plurality of light detecting elements each of which is associated with an entirety of the original and detects an intensity of the image-reading light reflected from said each of said positions on said entirety of the original, said each of the light detecting elements producing an electric signal indicative of the detected intensity of the image-reading light reflected from said each position on the original, said light detecting device further comprising a calculator which sums respective magnitudes of the electric signals produced by said light detecting elements, with respect to said each position on the original.

26. An optical scanner according to claim 25, further comprising a feeding device which moves at least one of the original and the light detecting device relative to each other in a feeding direction substantially perpendicular to a scanning direction in which the image-reading light emitted by the light emitting device scans the original.

27. An optical scanner comprising:

a light emitting device which emits an image-reading light toward an original having an original image thereon, such that the image-reading light scans the original by irradiating each of a plurality of positions on the original at a corresponding one of a plurality of times, said light emitting device comprising a light source which emits the image-reading light, a light deflector which deflects the image-reading light emitted by said light source toward the original such that the image-reading light scans the original, and a light converger which converges the image-reading light deflected by said light deflector, so that the converged image-reading light irradiates said each of said plurality of positions on the original;

a light detecting device which detects the image-reading light reflected from the original and thereby reads the original image thereon, said light detecting device including a plurality of light detecting elements each of which is associated with at least a part of the original and detects an intensity of the image-reading light reflected from said part of the original, said part of the original including at least two positions of said plurality of positions on the original, the respective image-reading lights detected by said plurality of light detecting elements having identical optical characteristics except the light intensity;

a memory device which stores image data representative of the original image read by said light detecting device;

a photosensitive body; and a control device which controls, according to the image data stored in said memory device, said light source to emit an image-forming light toward said photosensitive body via said light deflector and said light converger, so that a latent image corresponding to the original is formed on the photosensitive body.

28. An optical scanner comprising:

a light emitting device which emits an image-reading light toward an original having an original image thereon, such that the image-reading light scans the original by irradiating each of a plurality of positions on the original at a corresponding one of a plurality of times; and a light detecting device which detects the image-reading light reflected from the original and thereby reads the original image thereon, said light detecting device including a plurality of light detecting elements each of which is associated with at least a part of the original and detects an intensity of the image-reading light reflected from said part of the original, said part of the original including at least two positions of said plurality of positions on the original, the respective image-reading lights detected by said plurality of light detecting elements having identical optical characteristics except the light intensity, said light detecting device further including at least one converging lens which is provided between the original and said light detecting elements and which converges the image-reading line reflected from the original and permits the converged image-reading light to be incident to each of the light detecting elements.

29. An optical scanner comprising:

a light emitting device which emits an image-reading light toward an original having an original image thereon, such that the image-reading light scans the original by irradiating each of a plurality of positions on the original at a corresponding one of a plurality of times; and a light detecting device which detects the image-reading light reflected from the original and thereby reads the original image thereon, said light detecting device including a plurality of light detecting elements each of which is associated with at least a part of the original and detects an intensity of the image-reading light reflected from said part of the original, said part of the original including at least two positions of said plurality of positions on the original, the respective image-reading lights detected by said plurality of light detecting elements having identical optical characteristics except the light intensity, said light detecting elements being provided along a straight line extending substantially parallel to a scanning direction in which the image-reading light emitted by said light emitting device scans the original, said light detecting elements comprising at least three light detecting elements.

* * * * *